United States Patent Office 3,005,754
Patented Oct. 24, 1961

3,005,754
TETRACYCLINE FORMULATIONS
Alphonse Peter Granatek, Syracuse, N.Y., assignor, by mesne assignments, to Bristol-Myers Company, New York, N.Y., a corporation of Delaware
No Drawing. Filed Aug. 16, 1957, Ser. No. 678,522
5 Claims. (Cl. 167—65)

This invention relates to new and useful formulations of the antibiotic tetracycline and its hydrates, salts and complexes and, more particularly, to solutions of said antibacterial agents in propylene glycol, glycerine or mixtures thereof which are stabilized by the presence of both calcium hydroxide and calcium chloride and which are useful therapeutically for oral administration and for topical application as in ear drops.

This application is a continuation-in-part of my prior co-pending application S.N. 589,859, filed June 7, 1956, now abandoned.

Tetracycline is a relatively new, broad-spectrum antibiotic which has been described in J. Amer. Chem. Soc. 75, 4621–4623 (1953) and in Antibiotics Annual, pages 46–107 (1953–1954).

Tetracycline, whether supplied as base, hydrates or salts such as hydrochloride or calcium, is presently available only in solid form or as a suspension of solid particles with the exception of certain buffered, aqueous oral and injectable products which are stable only for very limited periods of time and must therefore be marketed as dry powders, called "dry mixes," and reconstituted just before use by the addition of diluents. Such reconstitution and limited stability is obviously undesirable and introduces additional expense and opportunity for errors, dilution and contamination. For many purposes the physician or veterinary prefers to use actual solutions rather than suspensions in order to increase rate of adsorption and palatability and reduce mechanical irritation; this is particularly true for oral preparations and certain topical formulations such as ear drops and eye drops. Such permanent, stable solutions of tetracycline have not been made available up to the present time because tetracycline is not sufficiently soluble in water except at very low pH and even then is not stable. Thus, tetracycline hydrochloride has a useful aqueous solubility only below pH 2; at this point it is both unstable and highly irritating.

A further complication arises from the fact that tetracycline in solution tends strongly to convert or epimerize spontaneously in large amounts to an inactive isomer, called epitetracycline or quatrimycin. Epitetracycline has not only been found to be inactive in vitro but has also been found to give no detectable antibiotic activity in the blood of five patients upon oral administration of a 250 mgm. capsule. The properties of epitetracycline have been described in J. Amer. Chem. Soc. 77, 4687 (1955), 78, 1515–1516 (1956) and Belgian Patent 542,223. The rate of transformation of tetracycline into epitetracycline is reported to increase in proportion to the amount of tetracycline in solution. This poses a major problem in the formulation of solutions of tetracycline, e.g. for oral and otic use, because it is necessary that such solutions be quite concentrated, e.g. from 5 to 100 mgm./cc. Thus Belgian Patent 542,223 reports the spontaneous isomerization in a matter of days at room temperature of numerous twenty percent solutions of tetracycline to mixtures in which about fifty percent of the antibiotic has been converted to the inactive epitetracycline. Saturated aqueous solutions of tetracycline contain only about 0.2 mgm./cc. at any pH acceptable for oral administration and thus are far too dilute to provide the minimum desired concentration of about 25–125 mgm./5 cc. (one teaspoon); even these solutions rapidly equilibrate to mixtures containing about fifteen to thirty percent of the inactive isomer.

The physician prefers to administer a drug in the form of a true solution for many reasons, e.g. accurate dosage with no problem of uniform resuspension of the settled solids, greater patient acceptance due to lack of a gritty feeling in the mouth, ease of visual detection of the possible existence of any insoluble impurities, greater ease of mixing with other foods or liquids for administration to infants, etc. The physician prefers to administer a liquid preparation which contains one therapeutic dose in no more than one or two teaspoons (5 or 10 cc.). The minimum such dose in the case of tetracycline is about 125 mgms.

There are no stable solutions of either tetracycline, chlortetracycline or oxytetracycline available to the physician. The two products which are used as solutions are oxytetracycline ear drops which are so unstable that they are supplied in two bottles, with the dry solids to be mixed with the solvent just before use, and parenteral products which are also supplied as dry powders to be reconstituted by the addition of sterile diluent just before use to give a product which in a matter of days loses bioactivity and also precipitates solid antibiotic.

To be considered stable, a product must show less than 15%–20% loss in potency on storage for 12 months at room temperature. It has also been established that a product has such stability if it shows less than 15%–20% loss in potency on storage for one month at 56° C., for two months at 45° C., or for four months at 37° C. Products showing a greater loss of potency at the indicated times and temperatures are not released for sale by the Federal Food and Drug Administration.

It has further been found that solutions in propylene glycol, glycerine or mixtures thereof of tetracycline hydrochloride, amphoteric tetracycline or calcium tetracycline at various pH's between 2.1 and 7.8 are not stable and are not rendered stable by the addition of magnesium chloride alone, of calcium hydroxide alone or of calcium chloride alone. In most cases such solutions lost over 50% of their potency upon only six months storage at room temperature.

The object of the present invention is therefore to provide a true solution of tetracycline containing about 5–100 mgm./cc. which is suitable for oral and topical use and at the same time represses the usual spontaneous transformation of the tetracycline to an inactive isomer, e.g. epitetracycline, either completely or at least to the extent of less than twenty, and preferably less than ten percent.

The object of the present invention has been attained by providing a non-toxic, permanent, stable solution of a form of tetracycline comprising a form of tetracycline, calcium hydroxide and calcium chloride dissolved in a substantially anhydrous solvent selected from the group consisting of propylene glycol, glycerine and mixtures thereof.

There is further provided, according to the present invention, a non-toxic, permanent, stable solution of a form of tetracycline comprising calcium hydroxide, calcium chloride and at least 5 mgm./cc. of a form of tetracycline dissolved in a substantially anhydrous solvent selected from the group consisting of propylene glycol, glycerine and mixtures thereof, said solution having a pH in the range of 6.0 to 8.0.

As a more specific embodiment of the present invention there is provided a non-toxic, permanent, stable solution of a form of tetracycline comprising calcium hydroxide, calcium chloride and at least 5 mgm./cc. of a form of tetracycline dissolved in a substantially anhydrous solvent selected from the group consisting of propylene glycol, glycerine and mixtures thereof, said solutions having a pH in the range of 6.0 to 8.0, each of said calcium hydroxide and said calcium chloride being present in an amount by weight equal to at least one-tenth the weight of said form of tetracycline, and containing less than twenty percent epitetracycline at any time. In this connection it is of course meant that the total weight of epitetracycline present in the solution is less than twenty percent of both the original weight of tetracycline and the combined weight of tetracycline and epitetracycline at any time.

Use is made in the present invention of the commercially available, substantially anhydrous grades of glycerine (i.e. U.S.P., which contains up to 2% water) or propylene glycol. Mixtures of these two solvents in any proportion may be used as preferred, e.g. for reasons of taste.

The solutions of the present invention contain tetracycline, tetracycline sodium hexamethaphosphate, tetracycline hydrochloride or another non-toxic organic or inorganic acid addition salt of tetracycline, e.g. citrate, acetate, nitrate, sulfate, etc., in amounts of about 25 to 100 mgm./cc. The former concentration provides a suitable oral dosage of 125 mgm./teaspoon and the latter is useful for dropping a concentrated solution into an infant's food or drink. More concentrated solutions than 100 mgm./cc. are generally not needed; less concentrated solutions are not desired or particularly useful.

In addition to the solvent and the tetracycline antibiotic, the only other essential ingredient of the present invention is the inhibitor of the spontaneous transformation of tetracycline to an inactive isomer. This is theorized to occur by epimerization to an inactive isomer which has been named epitetracycline. However, this invention is not dependent on nor restricted to any such theory. A mixture of calcium hydroxide and calcium chloride serves as such an inhibitor.

The formulations of the present invention are prepared by dissolving the tetracycline, the inhibitor (if not added later) and other optional ingredients in the solvent. The pH is then adjusted to the range of 6.0 to 10.0, and preferably to the range of 6.0 to 8.0, by the addition of a substantially anhydrous non-toxic base. Solid sodium hydroxide is useful; in some cases preference is given to solid calcium hydroxide, which supplies additional inhibitor. Naturally, more alkali is needed when the antibiotic is not used in the form of the free base; thus, when using tetracycline hydrochloride, the hydrochloric acid must be neutralized to bring the pH to the desired range. The pH of the solution is measured by a Beckman pH-meter directly without any dilution or other change. It is recognized that the term pH is technically meaningless in non-aqueous solvents but it is also apparent that such measurement supplies a perfectly practical means of obtaining the desired product.

The phrase "a form of tetracycline" as used herein includes the amphoteric base tetracycline sodium hexamethaphosphate and non-toxic organic and inorganic acid addition salts, such as the hydrochloride, sulfate, nitrate and citrate. Use may be made in the products of the present invention of preservatives, buffering agents, agents to increase absorption such as are disclosed in U.S. Patent 2,795,528, color-stabilizing agents (e.g. from 0.001 to 0.5 percent, and preferably 0.01 to 0.20 percent of bisulfite ion or metabisulfite ion), flavors, colors, sweetening agents and the like if desired but this is not essential.

The products of the present invention are useful in veterinary medicine, both for direct parenteral or oral administration and for addition to foods or drinking water, and as plant sprays or in other agricultural uses and for general industrial uses as an antibacterial agent, e.g. in textile solutions and for the preservation of food.

Further information is supplied by the following examples which are provided for purposes of information only and are not to be construed as limiting the invention.

*Example I*

Four formulations were prepared by mixing the following ingredients in descending order of their appearance in the table:

| Ingredients | Formulation Number | | | |
| --- | --- | --- | --- | --- |
| | 1 | 2 | 3 | 4 |
| Sodium Bisulfite_____g__ | 1.76 | 1.76 | 3.52 | .29 |
| Sodium Saccharin_____g__ | 36 | 36 | 72 | 6.0 |
| Sodium Sucaryl_____g__ | 36 | 36 | 72 | 6.0 |
| Methyl Paraben_____g__ | 1.0 | 1.0 | 2.0 | 0.16 |
| Propyl Paraben_____g__ | 0.25 | 0.25 | 0.5 | 0.042 |
| Tetracycline Hydrochloride_____g__ | 31.5 | 31.5 | 63.0 | 21.0 |
| Tetracycline (base)_____g__ | | | | |
| Insoluble Saccharin (acid)_____g__ | 8.4 | 8.4 | 16.8 | 1.4 |
| Lecithin_____g__ | 4.2 | 4.2 | 8.4 | 0.7 |
| Anhydrous 200 mesh CaCl$_2$_____g__ | 7.56 | 7.56 | 15.12 | 2.52 |
| Propylene Glycol_____cc__ | 630 | 1,260 | 2,520 | 210 |
| Glycerine U.S.P. (98%)_____cc__ | 630 | | | |
| Solid Ca(OH)$_2$_____g__ | 10.23 | 13.77 | 21.78 | 5.0 |
| Back Titration with conc. HCl__cc__ | 2.0 | | | |
| Final pH_____ | 6.8 | 6.8 | 6.7 | 6.9 |
| Approximate Molar Ratio of Ca++ to tetracycline_____ | 3 | 4 | 3.2 | 2 |
| Loss of Potency on storage at room Temperature for 6 to 9 months, in percent_____ | 0 | 7 | 13 | 8 |

The average loss in potency, and thus the maximum amount of transformation to an inactive isomer, was 7%.

Formulations were prepared which were identical with those above except that no calcium compound was added to inhibit the formation of the inactive isomer, epitetracycline. In this case, solid sodium hydroxide was used to adjust the pH. Each of these control formulations showed greater than 50% loss in potency (bio-activity) upon storage at room temperature for six months. Similar formulations containing no calcium chloride showed greater than 50% loss in potency upon storage at room temperature for twelve months.

Additional control formulations omitting both the two calcium compounds and the pH adjustment (i.e. tetracycline hydrochloride products had a pH of 2–3) also showed more than 50% loss in activity upon storage at room temperature for six months.

*Example II*

In order to formulate additional preparations in which the formation of an inactive isomer of tetracycline is held to less than 20% even upon storage at room temperature for as long as twelve months, the procedures of Formulations 2, 3 and 4 of Example I are followed except that the propylene glycol is replaced with an equal volume of glycerine, U.S.P.

*Example III*

The following ingredients plus coloring and flavoring agents were mixed, made up to 2 oz. (60 ml.) by the addition of propylene glycol, glycerine or mixtures thereof as indicated, adjusted as to pH if so indicated by the addition of a solution of Ca(OH)$_2$ in the solvent and found to give stable solutions exhibiting full antibacterial activity and having the indicated stability on storage.

|  | Formulation Number | | | | | | | |
|---|---|---|---|---|---|---|---|---|
|  | 1 | 2 | 3 | 4 | 5 | 6 | 7 | 8 |
| Tetracycline, amphoteric, micronized __g__ | 1.5 | 1.5 | 1.5 | | | | 3.16 | |
| Tetracycline hydrochloride, micronized __g__ | | | | 6.0 | | | | 3.35 |
| Calcium tetracycline __g__ | | | | | 2.22 | 8.88 | | |
| Tetracycline sodium hexametaphosphate __g__ | | | | | | | | |
| Na HSO$_3$ __g__ | .08 | .08 | .08 | .08 | .08 | .08 | .14 | .14 |
| Sodium saccharin __g__ | 1.71 | 1.71 | 1.71 | .17 | 1.7 | | 2.85 | 2.85 |
| Sodium Sucaryl __g__ | 1.71 | 1.71 | 1.71 | .17 | 1.7 | 1.7 | 2.85 | 2.85 |
| Methyl Paraben __g__ | .048 | .048 | .048 | .046 | .047 | .046 | .08 | .08 |
| Propyl Paraben __g__ | .012 | .012 | .012 | .012 | .012 | .012 | .02 | .02 |
| Saccharin acid __g__ | .4 | .4 | .4 | .4 | .4 | .04 | | .67 |
| Lecithin __g__ | .2 | .2 | .2 | .2 | | | | |
| Concentrated hydrochloric acid __cc__ | | | | | | | | |
| Calcium chloride, anhydrous __g__ | .36 | .36 | .36 | .72 | .41 | 1.66 | 1.38 | .69 |
| Calcium hydroxide, solid __g__ | .52 | .49 | .66 | .68 | .56 | 1.78 | 0.51 | .28 |
| Propylene glycol __percent__ | 100 | 50 | 100 | 100 | 25 | 25 | 25 | 50 |
| Glycerine, U.S.P. __do__ | | 50 | | | 75 | 75 | 75 | 50 |
| pH (asterisk means adjusted) | 6.7* | 6.8* | 6.7* | 6.9* | 9.8* | 7.8* | 7.3 | 7.7 |
| Percentage loss of Potency on Storage: | | | | | | | | |
| at room temperature for 12 months | 0 | 0 | 0 | 2 | | | | |
| at 45° C. (months) | | 7(3) | 2(3) | | 0(4) | | | |
| at 56° C. (months) | 0(3) | 0(1) | 0(1) | 10(2) | 6(2) | 13(2) | 4(4) | 7(3) |

I claim:

1. A non-toxic, permanent, stable solution of a form of tetracycline comprising a form of tetracycline, calcium hydroxide and calcium chloride dissolved in a substantially anhydrous solvent selected from the group consisting of propylene glycol, glycerine and mixtures thereof, each of said calcium hydroxide and said calcium chloride being present in an amount by weight equal to at least one-tenth the weight of said form of tetracycline.

2. A non-toxic, permanent, stable solution of a form of tetracycline comprising calcium hydroxide, calcium chloride and at least 5 mgm./cc. of a form of tetracycline dissolved in a substantially anhydrous solvent selected from the group consisting of propylene glycol, glycerine and mixtures thereof, each of said calcium hydroxide and said calcium chloride being present in an amount by weight equal to at least one-tenth the weight of said form of tetracycline.

3. A non-toxic, permanent, stable solution of a form of tetracycline comprising calcium hydroxide, calcium chloride and at least 5 mgm./cc. of a form of tetracycline dissolved in a substantially anhydrous solvent selected from the group consisting of propylene glycol, glycerine and mixtures thereof, said solution having a pH in the range of 6.0 to 8.0, each of said calcium hydroxide and said calcium chloride being present in an amount by weight equal to at least one-tenth the weight of said form of tetracycline.

4. A non-toxic, permanent, stable solution of a form of tetracycline comprising calcium hydroxide, calcium chloride and at least 5 mgm./cc. of a form of tetracycline dissolved in a substantially anhydrous solvent selected from the group consisting of propylene glycol, glycerine and mixtures thereof, said solutions having a pH in the range of 6.0 to 8.0, each of said calcium hydroxide and said calcium chloride being present in an amount by weight equal to at least one-tenth the weight of said form of tetracycline, each of said calcium hydroxide and said calcium chloride being present in an amount by weight equal to at least one-tenth the weight of said form of tetracycline.

5. A non-toxic, permanent, stable solution adjusted to the range of pH 6.0 to 8.0 comprising calcium hydroxide, calcium chloride and from about 25 to about 100 mgm./cc. of a form of tetracycline dissolved in a substantially anhydrous solvent selected from the group consisting of propylene glycol, glycerine and mixtures thereof, each of said calcium hydroxide and said calcium chloride being present in an amount by weight equal to from one-tenth to one-half the weight of said form of tetracycline.

References Cited in the file of this patent

UNITED STATES PATENTS 2,671,806   Winterbottom _____ Mar. 9, 1954

FOREIGN PATENTS 506,950   Belgium _____ Nov. 30, 1951
503,866   Canada _____ June 22, 1954

OTHER REFERENCES

Finaly: "Terramycin, A New Antibiotic," Science, Jan. 27, 1950, p. 85.

Boothe: "Tetracycline," J.A.C.S., vol. 75, Sept. 20, 1954, p. 4621.

Archer (Trinidad): No. 7, of 1954, 27 pp. esp. at p. 11.

Doerschuk: "Reversible Isomerizations in the Tetracycline Family," J.A.C.S., vol. 77, Sept. 5, 1955, p. 4687.

Koppanyi: "Antioxidant and Stabilizing Action of Propylene Glycol," Fed. Proc., Mar. 1950, pp. 291 and 292.